United States Patent
Heiskanen et al.

(10) Patent No.: US 10,421,230 B2
(45) Date of Patent: Sep. 24, 2019

(54) METHOD FOR THE MANUFACTURING OF A POLYMER PRODUCT WITH SUPER- OR HIGHLY HYDROPHOBIC CHARACTERISTICS, A PRODUCT OBTAINABLE FROM SAID METHOD AND USE THEREOF

(71) Applicant: Stora Enso OYJ, Helsinki (FI)

(72) Inventors: Isto Heiskanen, Imatra (FI); Nina Miikki, Imatra (FI)

(73) Assignee: Stora Enso OYJ, Helsinki (FI)

( * ) Notice: Subject to any disclaimer, the term of this patent is extended or adjusted under 35 U.S.C. 154(b) by 116 days.

(21) Appl. No.: 14/430,675

(22) PCT Filed: Sep. 24, 2013

(86) PCT No.: PCT/IB2013/058804
§ 371 (c)(1),
(2) Date: Mar. 24, 2015

(87) PCT Pub. No.: WO2014/049518
PCT Pub. Date: Apr. 3, 2014

(65) Prior Publication Data
US 2015/0231821 A1    Aug. 20, 2015

(30) Foreign Application Priority Data

Sep. 25, 2012 (SE) ........................ 1251079

(51) Int. Cl.
*B05D 3/12* (2006.01)
*B29C 59/02* (2006.01)
(Continued)

(52) U.S. Cl.
CPC .............. *B29C 59/022* (2013.01); *B05D 3/12* (2013.01); *B32B 27/10* (2013.01); *B32B 27/32* (2013.01);
(Continued)

(58) Field of Classification Search
CPC .............................. B05D 3/12; B29C 59/022; B29K 2023/0633; B29K 2995/0093;
(Continued)

(56) References Cited

U.S. PATENT DOCUMENTS 7,285,331 B1   10/2007 Reihs et al.
2003/0096083 A1   5/2003 Morgan et al.
(Continued)

FOREIGN PATENT DOCUMENTS

CN    1854174    11/2006
CN    101168947    4/2008
(Continued)

OTHER PUBLICATIONS

Office Action issued by the Patent Office of the People's Republic of China dated Apr. 5, 2016.
(Continued)

*Primary Examiner* — Alexander M Weddle
(74) *Attorney, Agent, or Firm* — Greer, Burns & Crain Ltd.

(57) ABSTRACT

The present invention relates to a method for manufacturing a polymer product with super- or highly hydrophobic characteristics, preferably in the form of a film. Also methods for the manufacturing of a laminate and a polymer coated paper or board product, respectively, both having said characteristics, are disclosed.

Figure 1:
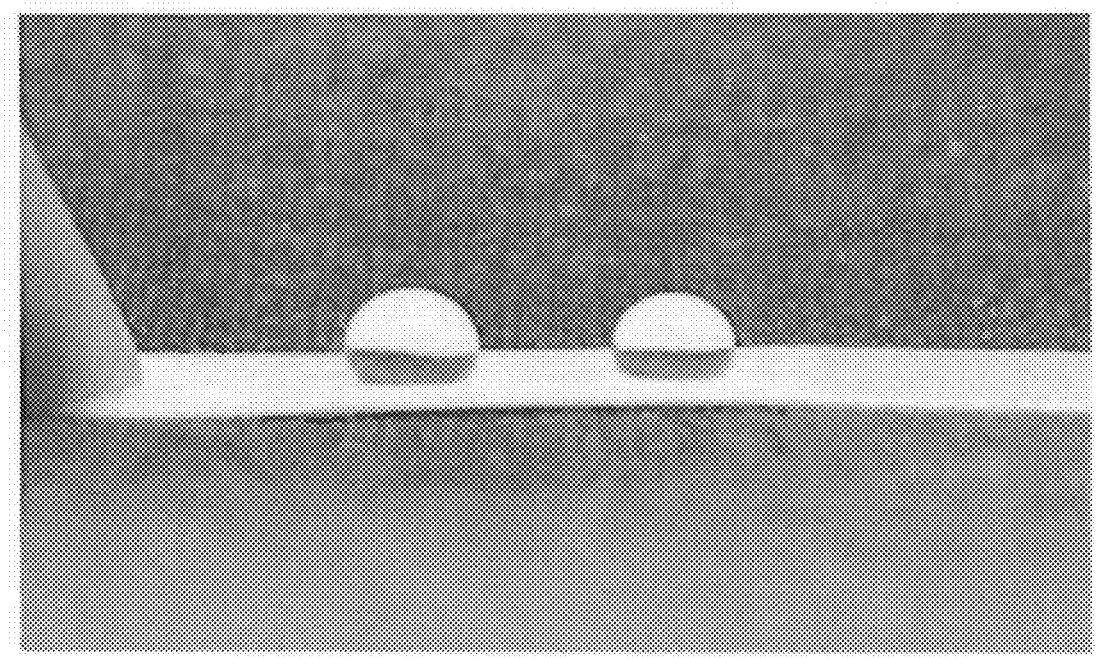

The present invention also relates to products obtainable by said methods and uses thereof.

14 Claims, 8 Drawing Sheets

(51) Int. Cl.
| | |
|---|---|
| *B32B 37/10* | (2006.01) |
| *D21H 27/10* | (2006.01) |
| *D21H 19/20* | (2006.01) |
| *D21H 19/66* | (2006.01) |
| *D21H 21/16* | (2006.01) |
| *B32B 27/10* | (2006.01) |
| *B32B 27/32* | (2006.01) |
| *C09D 123/06* | (2006.01) |
| *B29C 59/04* | (2006.01) |
| *B29K 23/00* | (2006.01) |

(52) U.S. Cl.
CPC ............ *B32B 37/10* (2013.01); *C09D 123/06* (2013.01); *D21H 19/20* (2013.01); *D21H 19/66* (2013.01); *D21H 21/16* (2013.01); *D21H 27/10* (2013.01); *B29C 59/04* (2013.01); *B29C 59/046* (2013.01); *B29C 2059/023* (2013.01); *B29K 2023/0633* (2013.01); *B29K 2995/0093* (2013.01); *B32B 2307/754* (2013.01); *Y10T 428/24802* (2015.01); *Y10T 428/24934* (2015.01); *Y10T 428/31938* (2015.04)

(58) Field of Classification Search
CPC ... B32B 2307/754; B32B 27/10; B32B 27/32; B32B 37/10; C09D 123/06; Y10T 428/24802; Y10T 428/24934; Y10T 428/31938
USPC ........................... 427/361; 156/242; 264/293
See application file for complete search history.

(56) References Cited

U.S. PATENT DOCUMENTS

| | | | | |
|---|---|---|---|---|
| 2003/0187170 | A1* | 10/2003 | Burmeister | ........... B29C 43/222 526/307.8 |
| 2004/0047997 | A1 | 3/2004 | Keller et al. | |
| 2005/0120915 | A1 | 6/2005 | Bowden et al. | |
| 2005/0221056 | A1 | 10/2005 | Schwonke et al. | |
| 2007/0158350 | A1 | 7/2007 | Peuker et al. | |
| 2010/0195204 | A1 | 8/2010 | Walker et al. | |
| 2011/0031156 | A1* | 2/2011 | Heiskanen | .............. B32B 27/10 206/524.6 |
| 2011/0287203 | A1* | 11/2011 | Victor | ................. B29C 37/0053 428/36.9 |
| 2011/0318539 | A1 | 12/2011 | Ozawa et al. | |
| 2012/0118886 | A1 | 5/2012 | Sekiguchi et al. | |
| 2015/0330025 | A1* | 11/2015 | Luna Marroquin | ... D21H 17/11 162/158 |

FOREIGN PATENT DOCUMENTS

| | | | |
|---|---|---|---|
| CN | 101537682 | 9/2009 | |
| CN | 101890826 | 11/2010 | |
| CN | 102317067 | 1/2012 | |
| FR | 2782291 | 2/2000 | |
| JP | H09155972 A | 6/1997 | |
| JP | 2009256506 | 11/2009 | |
| JP | 2011240546 | 12/2011 | |
| JP | 201277179 A | 4/2012 | |
| JP | 2012153430 | 8/2012 | |
| SE | 7512107 | 5/1976 | |
| WO | WO-2012087352 A2 * | 6/2012 | ............... B05D 5/08 |
| WO | WO 2013154414 A1 * | 10/2013 | ............. D21H 17/11 |

OTHER PUBLICATIONS

New Zealand Intellectual Property Office, First Examination Report, dated Aug. 23, 2016.
Shirtcliffe, Neil J. et al., "An Introduction to SUperhydrophobicity," Advances in Colloid and Interface Science, 161 (2010) 124-138.
Puukilainen, Esa et al., "Superhydrophobic Polyolefin Surfaces: Controlled Micro- and Nanostructures," Langmuir, 2007, 23 (13), 7263-7268.
Forbes, Peter, "Self Cleaning Materials," Scientific American, Aug. 2008, pp. 88-95.
International Searching Authority, Written Opinion of the International Searching Authority, PCT/IB2013/058804, dated Jan. 23, 2014.
International Searching Authority, International Search Report, PCT/IB2013/058804, dated Jan. 23, 2014.
International Bureau of WIPO, International Preliminary Report on Patentability, PCT/IB2013/058804, dated Mar. 31, 2015.
European Patent Office, European Search Report and Written Opinion, PCT/IB2013/058804, dated May 4, 2016.
Office Action for corresponding Mexican Patent Application No. MX/a/2015/003739.
First Examination Report for corresponding Saudi Arabian Patent Application No. 515360185.
Second Examination Report for corresponding Saudi Arabian Patent Application No. 515360185.
Office Action for corresponding Japanese Patent Application No. 2015-532567, dated Nov. 30, 2017.
Further Examination Report for corresponding New Zealand Patent Application No. 706157, dated Mar. 21, 2017.
Li, "Practical Manual of Major Packaging Characteristics and Resource Regeneration," Beijing: China Environmental Science Press, Oct. 2010.
Gao, "Technology of Food Packaging," Beijing: China Science and Technology Press, Aug. 2012.
Chinese Office Action, dated Jan. 10, 2017 for Appl. No. 201380050081.X.

* cited by examiner

METHOD FOR THE MANUFACTURING OF A POLYMER PRODUCT WITH SUPER- OR HIGHLY HYDROPHOBIC CHARACTERISTICS, A PRODUCT OBTAINABLE FROM SAID METHOD AND USE THEREOF

This application is a U.S. National Phase under 35 U.S.C. § 371 of International Application No. PCT/IB2013/058804, filed Sep. 24, 2013, which claims priority under 35 U.S.C. §§ 119 and 365 to Swedish Application No. 1251079-8, filed Sep. 25, 2012.

FIELD OF INVENTION

The present invention relates to a method for manufacturing a polymer product with super- or highly hydrophobic characteristics, preferably in the form of a film. Also methods for the manufacturing of a laminate and a polymer coated paper or board product, respectively, both having said characteristics, are disclosed.

The present invention also relates to products obtainable by said methods and uses thereof.

BACKGROUND

Superhydrophobicity as a phenomenon has been disclosed in "An introduction to superhydrophobicity" Neil J. Shirtcliffe et al, Advances in Colloid and Interface Science, 161 (2010) 124-138.

Superhydrophobic Polyolefin Surfaces are also disclosed in "Superhydrophobic Polyolefin Surfaces: Controlled Micro- and Nanostructures", Esa Puukilainen et al, *Langmuir*, 2007, 23 (13), 7263-7268.

Further, self cleaning technologies are disclosed in "Self cleaning materials", Peter Forbes, Scientific American, August, 2008, pp. 88-95.

Further production of corrugated cardboard is disclosed in FR2782291.

SE7512107 discloses a method of making paper-plastic laminates.

An image transfer belt with controlled surface topography to improve toner release is further disclosed in US2010/300604.

However none of these documents discloses solutions how to
make it easy to empty dairy packages,
reduce foaming during conveying soft drinks or beer into a cup or how to
obtain a nice touch surface.

Accordingly there is a need for a solution solving one or more of the above problems.

SUMMARY OF THE INVENTION

The present invention solves one or more of the above problems, by providing according to a first aspect a method for manufacturing a polymer product with super- or highly hydrophobic characteristics, preferably in the form of a film, comprising the following step:
a) providing a polymer melt and contacting said polymer melt with a mould giving said polymer product a pattern providing a lotus effect, and
b) optionally cooling the polymer product obtained (which is preferred).

The present invention also provides according to a second aspect a method for manufacturing a laminate comprising a polymer product with super- or highly hydrophobic characteristics, preferably in the form of a film, and a web of paper or board comprising the following step:
i) providing a polymer melt and contacting said polymer melt with a mould giving said polymer product a pattern providing a lotus effect,
ii) optionally cooling the polymer product obtained, and
iii) providing a web of paper or board and laminating said polymer product to a web of paper or board.

The present invention also provides according to a third aspect a method for manufacturing a polymer coated paper or board product, wherein said product has super- or highly hydrophobic characteristics, comprising the following steps:
x) providing a melt of polymer and a web of paper or board, coating said web of paper/board with said melt of polymer,
xi) passing said polymer coated web of paper or board over a roll whereby said roll faces the polymer coated side and wherein also said roll provides a mould giving said coated side a pattern providing a lotus effect when in contact with said coated side of said composite, and
xii) optionally cooling said product obtained (which is preferred).

The present invention also provides according to a fourth aspect a polymer product obtainable by the method according to the first aspect.

The present invention also provides according to a fifth aspect a laminate obtainable by the method according to the second aspect.

The present invention also provides according to a sixth aspect a polymer coated paper or board product obtainable by the method according to the third aspect.

The present invention also provides according to a seventh aspect use of a polymer product according to the first aspect, a laminate product according to the second aspect or a product according to the third aspect in food packages, preferably pouches, cups or beakers.

The present invention also provides according to an eighth aspect use of the laminate product according to the second aspect or a product according to the third aspect in liquid packaging board, preferably in food packages for containing beverages, dairy products (such as butter or other milk products), edible oil products (such as liquid margarine or vegetable oil), frozen food materials or dry food.

The present invention also provides according to a ninth aspect use of a polymer product according to the first aspect, a laminate product according to the second aspect or a product according to the third aspect in a disposable drinking cup.

The present invention also provides according to a ninth aspect use of a polymer product according to the first aspect, a laminate product according to the second aspect or a product according to the third aspect in a glue or tooth paste package.

The present invention also provides according to a tenth aspect use of a polymer product according to the first aspect, a laminate product according to the second aspect or a product according to the third aspect in a tray or plate.

The present invention also provides according to a eleventh aspect use of a polymer product according to the first aspect, a laminate product according to the second aspect or a product according to the third aspect in an autoclavable product package, preferably in a package autoclavable at a temperature of at least 115° C. The temperature in an autolave is typically in the range of 115-125° C. (tomato ext.) and for meat one may use 130° C.

The present invention also provides according to a twelfth aspect use of a polymer product according to the first aspect, a laminate product according to the second aspect or a product according to the third aspect, to control adhesion or friction, or control the thermal conductivity.

The present invention also provides according to a thirteenth aspect a packaging board comprising a fibrous base and one or more polymer coating layers on one or both sides of the fibrous base wherein one or both of the layers has super- or highly hydrophobic characteristics.

DETAILED DESCRIPTION OF THE INVENTION

It is intended throughout the present description that the expression "super- or highly hydrophobic characteristics" embraces that a lotus effect can be detected. This means that a reduced wettability is to be seen (such effect is e.g. know from leaves). Via the Young's equation the degree of wettability can be calculated. The degree of wetting is calculated by using the interfacial tension ratio of the materials. A complete wetting is indicated by a contact angle of 0° whereas complete unwettability is indicated by a contact angle of 180°. See also FIG. 1 showing a material with super- or highly hydrophobic characteristics.

It is intended throughout the present description that the expression "oleophobic wax" means a compound which enhances the lotus effect. In addition to the above meaning it also encompasses that it is repellant to water. Said compound may be selected from AKD or Calcium stearate, or combinations thereof.

According to a preferred embodiment of the second and third aspect of the invention the board is a board for use in liquid carton.

According to a preferred embodiment of the second and third aspect of the invention the board is a packaging board and the weight of the polymer coating is at least 14 g/m$^2$.

According to a preferred embodiment of the second and third aspect of the invention the density of the fibrous board base is at least 575 kg/m$^3$, more preferred at least 615 kg/m$^3$ and most preferred at least 650 kg/m$^3$.

According to a preferred embodiment of the third aspect of the invention the roll is a cooling drum.

According to a preferred embodiment of the third aspect of the invention the roll has a mould essentially resembling a cup field.

According to a preferred embodiment of the first, second and third aspect of the invention the polymer is selected from the group comprising polyethylene (PE; which may e.g. be low density polyethylene—LDPE, linear low density polyethylene—LLDPE or high density polyethylene—HDPE, polypropylene (PP), ethylene vinyl alcohol (EVOH) or ethylene vinyl acetate (EVA) or a polyester such as polyethylene terephthalate (PET), polylactic acid (PLA), polyamide (PA; such as polyamide 6-PA6) or combinations thereof.

According to a preferred embodiment of the first, second and third aspect of the invention also an oleophobic wax is added on to the polymer.

According to a preferred embodiment of the first, second and third aspect of the invention, oil is added on top of the polymer, which preferably is PE, after moulding. This has the effect of making the surface totally slippery against e.g. yoghurt and such The present invention also provides the possibility to have different colours like blue, gold and red. Further it also provides a positive touch effect.

Providing a polymer melt as set out in the first aspect of the invention may also be done so that the metal surface is heated (which melts the polymer indirectly).

The cooling step according to the first, second and third aspect may be passive (i.e. just let the cooling occur in room temperature) or active.

Preferred features of each aspect of the invention are as for each of the other aspects mutatis mutandis. The prior art documents mentioned herein are incorporated to the fullest extent permitted by law. The invention is further described in the following examples, together with the appended figures, which do not limit the scope of the invention in any way.

Embodiments of the present invention are described as mentioned in more detail with the aid of examples of embodiments, together with the appended figures, the only purpose of which is to illustrate the invention and are in no way intended to limit its extent.

FIGURES

FIG. 1 discloses a material with super- or highly hydrophobic characteristics (thus highlighting the lotus effect).

Figure 2:
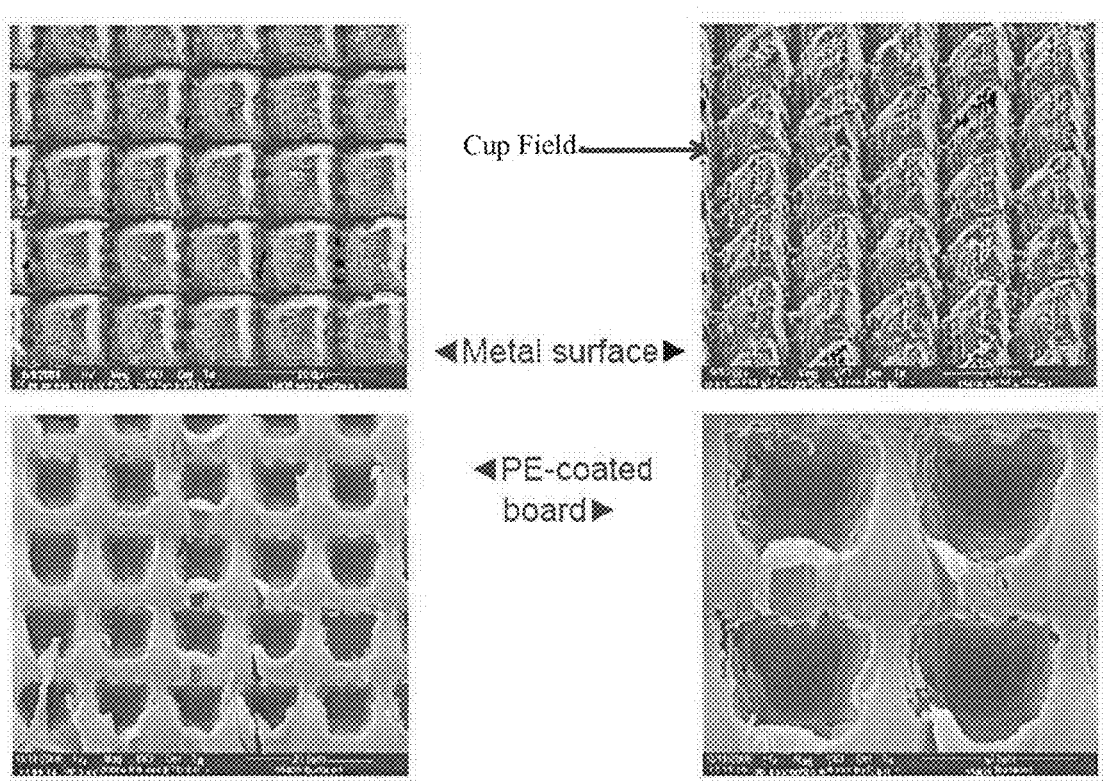

FIG. 2 discloses hydrophobic liquid package using Metal mould 1.

Figure 3:
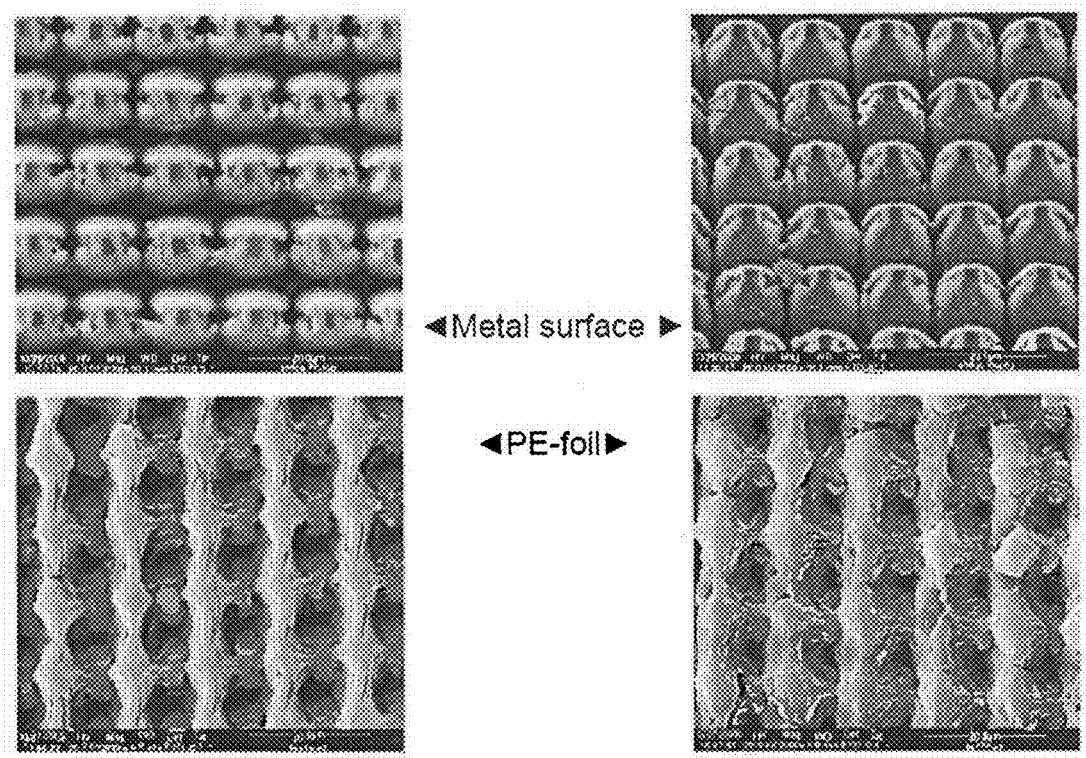

FIG. 3 discloses hydrophobic liquid package using Metal mould 2.

Figure 4:
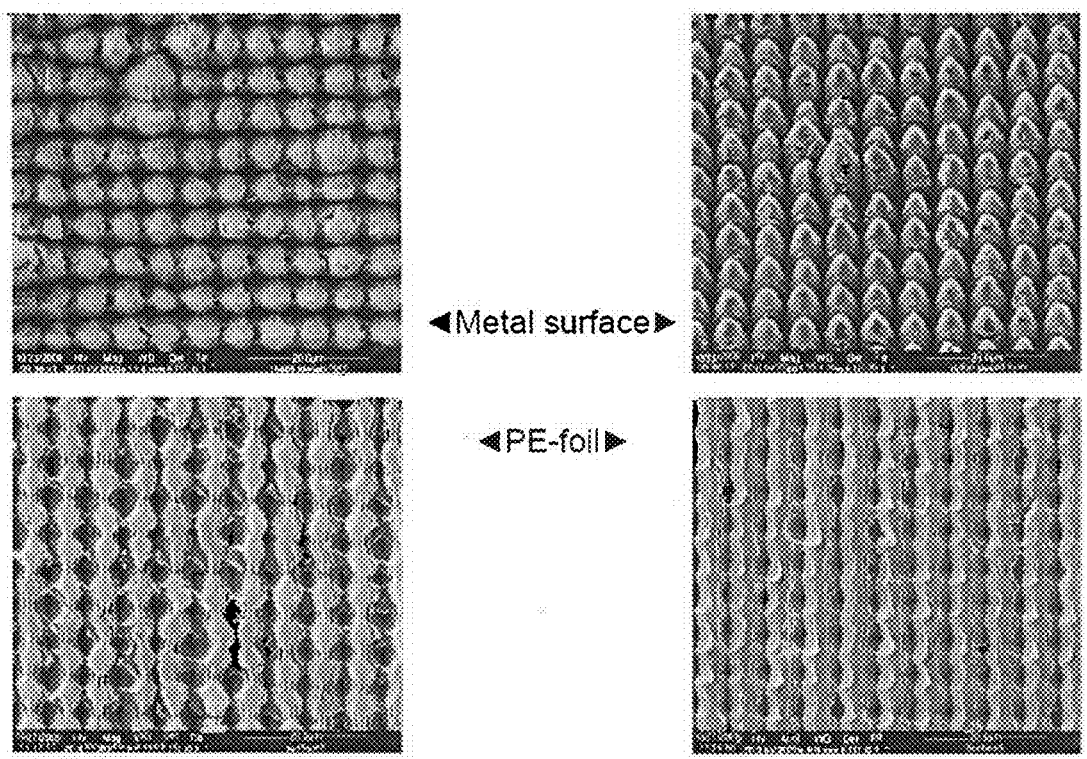

FIG. 4 discloses hydrophobic liquid package using Metal mould 3: 6 µm grooves cross direction, barrell lens f25.

Figure 5:
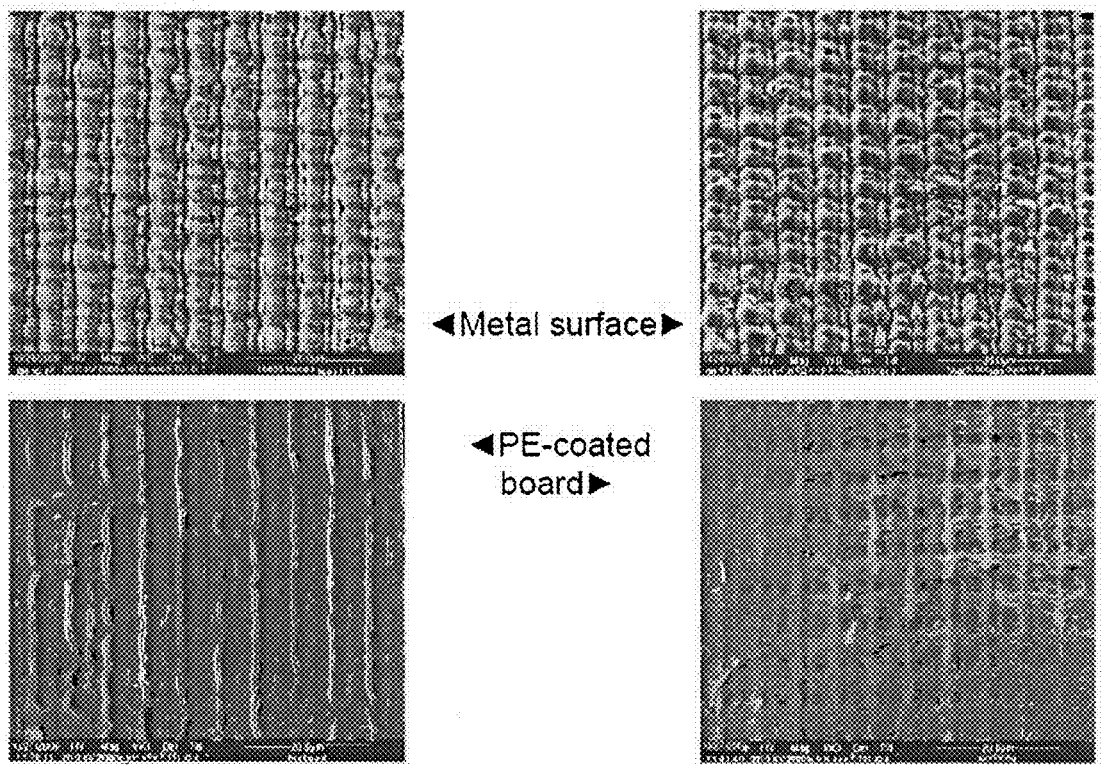

FIG. 5 discloses hydrophobic liquid package using Metal mould 4: 6 µm grooves cross direction, barrel lens f12, 7.

Figure 6:
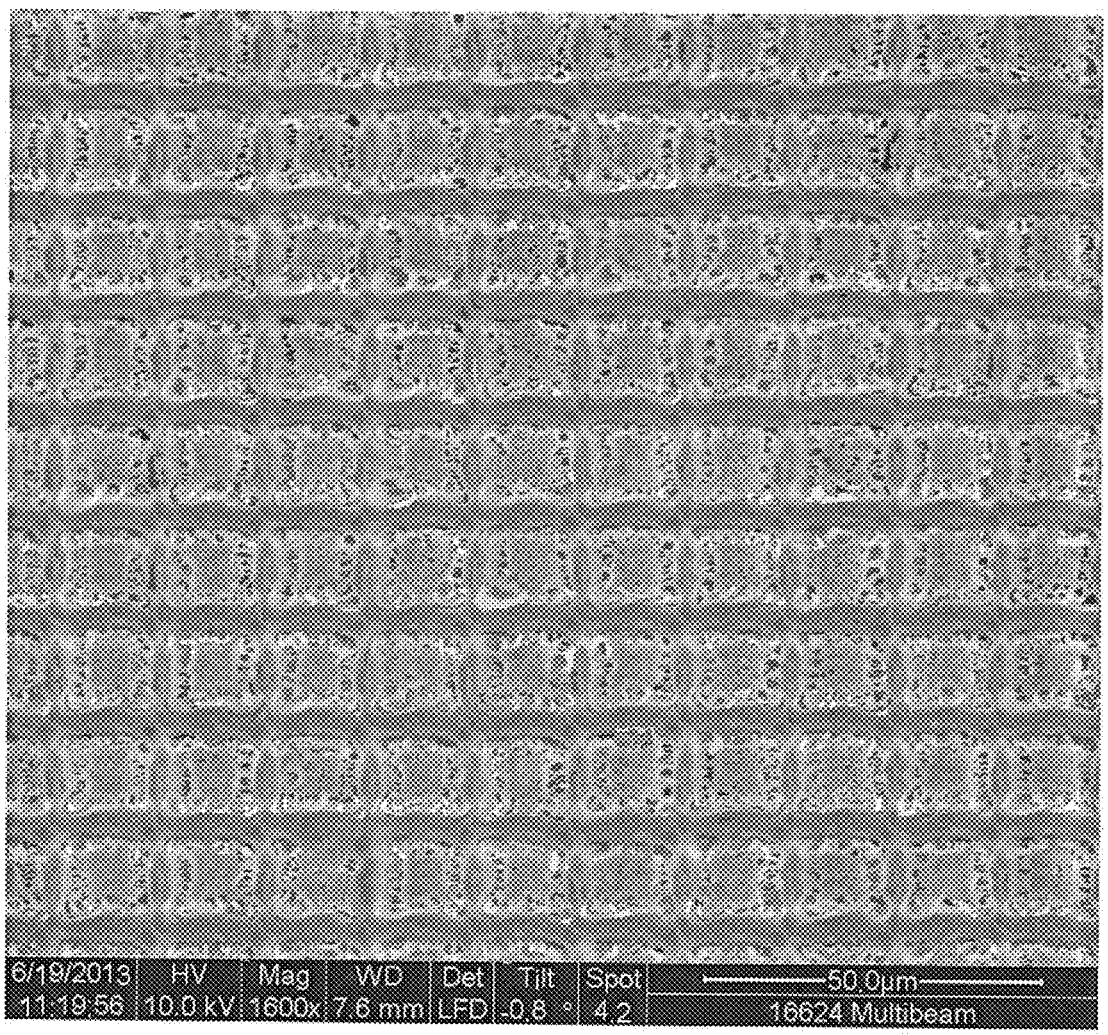

FIG. 6 discloses a material with a pattern comprising areas with higher squares.

Figure 7:
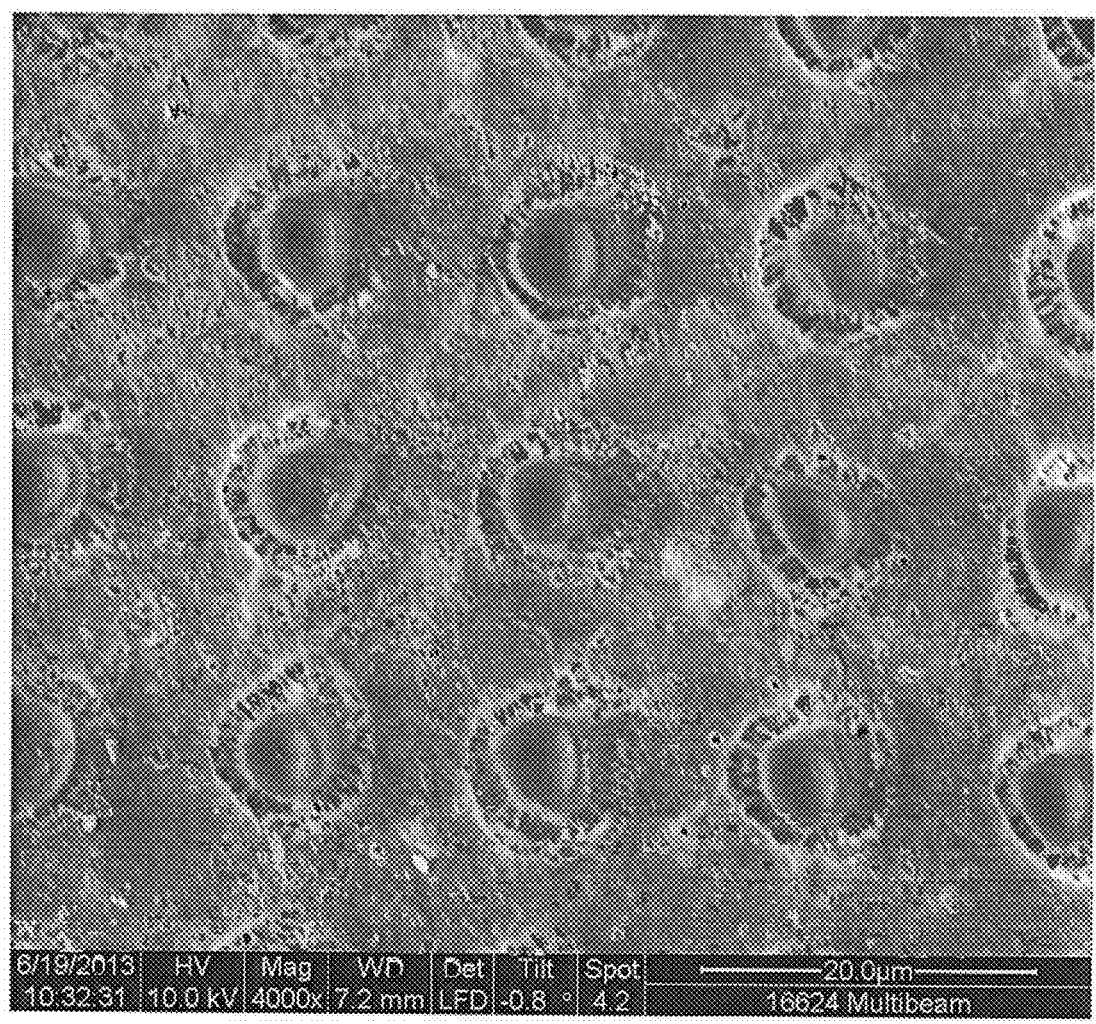

FIG. 7 discloses a material with a pattern comprising areas with pins.

Figure 8:
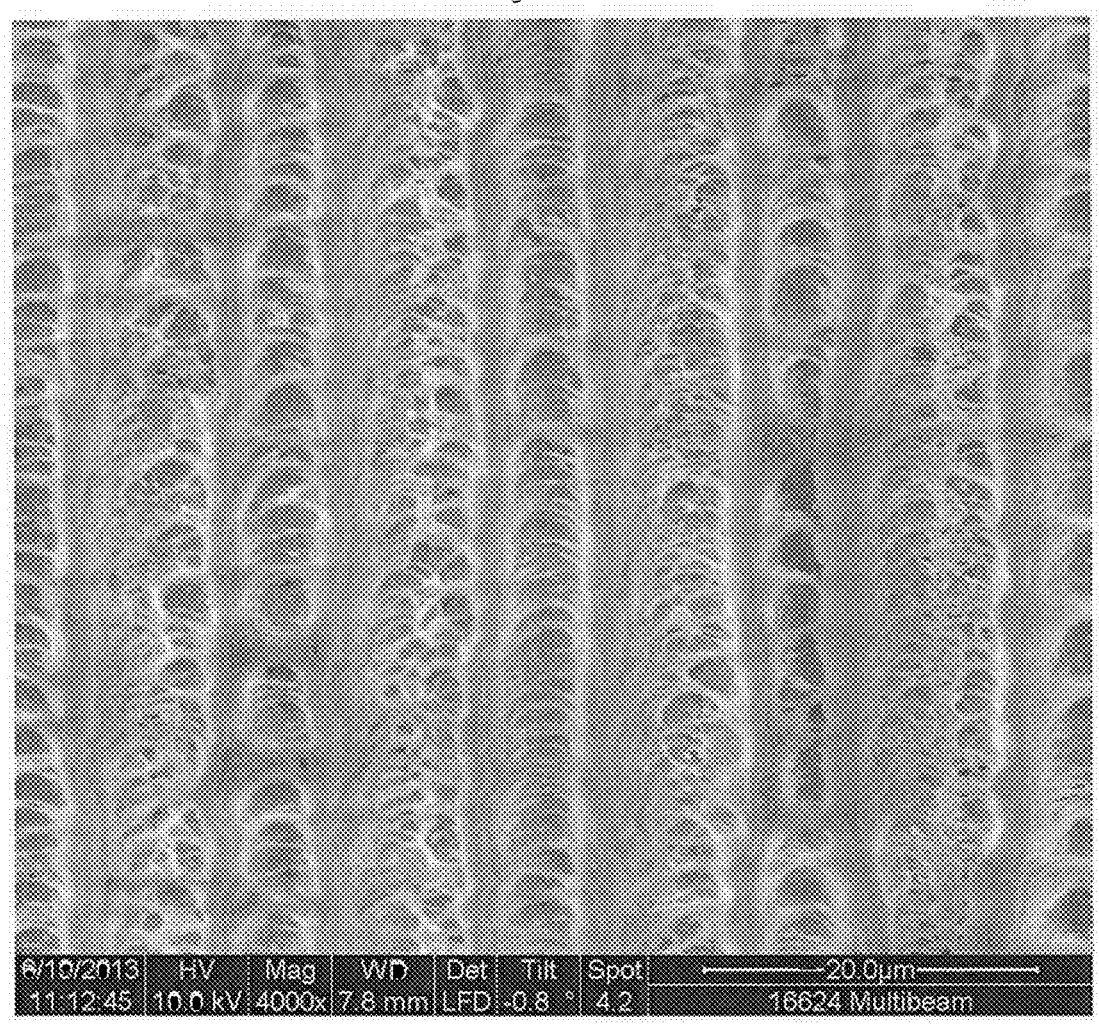

FIG. 8 discloses a material with a pattern comprising areas with linear bulges.

EXAMPLES

Example 1

Testing:
Moulded steel surface was formed with the help of laser
The mould was pressed with PE-foil or Cupforma Dairy 2PE 20+255+35 (both encompass LDPEs) to achieve replica pattern on plastic and on liquid package board surface, respectively.
Contact angles of liquid and surface were measured for:
  Water
  Milk
4 patterned metal surfaces were pressed with PE-foil or liquid package board to get patterned surfaces
Surfaces 1 and 3 had the highest contact angles as set out below
Contact angels °, with water and milk as set out below

TABLE 1 results from the trials set out above

|  | Ref. | Surface 1 | Surface 2 | Surface 3 | Surface 4 |
|---|---|---|---|---|---|
| PE-foil | | | | | |
| water | 83.1 | 104.6 | 100.2 | 96.8 | 97.7 |
| milk | 88.2 | 80.0 | 87.3 | 81.4 | 71.3 |

TABLE 1-continued results from the trials set out above

|  | Ref. | Surface 1 | Surface 2 | Surface 3 | Surface 4 |
|---|---|---|---|---|---|
| Cupforma Dairy 20 + 255 + 35 | | | | | |
| water | 93.2 | | | 139.4 | 91.7 |
| milk | 71.5 | | | | 71.3 |

Explanations:
Surface 1—hydrophobic liquid package using metal mould 1
Surface 2—hydrophobic liquid package using metal mould 2
Surface 3—hydrophobic liquid package using metal mould 3: 6 μm grooves cross direction, barrell lens f25.
Surface 4—hydrophobic liquid package using metal mould 4: 6 μm grooves cross direction, barrel lens f12,7.

Further it could also be detected a positive touch effect as follows. Same samples were creaking or squealing when scratching the surface with a human nail. Just holding the samples gave a touch effect that was nice and pleasant.

Example 2

Three different kinds of super hydrophobic surfaces were formed and top layer of surface was PE. All of surfaces had higher contact angles than 170° which means that drop of water will not stay on surface. It simply runs or floats away. These surfaces were formed with squares, lines and pins (as also reflected by FIGS. 6-8. With squares and pins you could not predict the direction of drop movement. With lines the drop was following the line.

The surfaces were made of PE, in particular an LDPE for liquid packaging hoard. The PE was Borealis CA8200. PE coating of PE-coated board was too thin to get superhydrophobic surface. The testing temperature was 125° C. (to get melted PE). Tests were then done with PE-foil—9 layers of foil were put on each other and this stack was pressed with mould (form). A few PE-layers (bottom side) was replaced with PE-coated liquid packaging board and mould was on top. This stack was also pressed with mould. Mould and PE was heated and pressed together to copy the form to PE surface.

The surface metal mould was formed with laser as a replica (pattern). Tre different patterns were made and all three surfaces were superhydrophobic. Their contact angle with water drop was over 170°. It was difficult to add a drop on surface, it did not fix to the surface. If managing to spill a drop on the surface it rolled away.

Further the surface with lines had a special character. The drops rolled away at line direction. FIG. 6 reflects the pattern comprising areas with higher squares. FIG. 7 reflects the pattern comprising areas with pins. FIG. 8 reflects the pattern comprising areas with linear bulges. Said figures depict, as mentioned, three different superhydrophobic PE surfaces.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods may be combined with other known methods. Other aspects, advantages and modifications within the scope of the invention will be apparent to those skilled in the art to which the invention pertains.

The invention claimed is:

1. A method for manufacturing a product comprising a polymer coated paper or board, wherein said product has super- or highly hydrophobic characteristics, comprising the following steps:
    a. providing a melt of polymer and a web of paper or board and coating said web of paper or board directly with said melt of polymer;
    b. passing said polymer coated web of paper or board over a roll whereby said roll faces the polymer coated side and wherein also said roll provides a mould to produce said product comprising said polymer coated paper or board with a coated side which has a pattern providing a lotus effect, wherein the mould comprises an array of squares or an array of pins; and
    c. cooling said product obtained.

2. A method according to claim 1 wherein the roll is a cooling drum.

3. A method according to claim 1, wherein the product is a packaging board, wherein the step of providing a web of paper or board comprises providing a board, wherein the board comprises a fibrous board base, and wherein the weight of the polymer coating is at least 14 $g/m^2$.

4. A method according to claim 3, wherein the density of the fibrous board base is at least 575 $kg/m^3$.

5. A method according to claim 4, wherein the polymer is selected from the group consisting of polyethylene (PE), polypropylene (PP), ethylene vinyl alcohol (EVOH), ethylene vinyl acetate (EVA), a polyester, polylactic acid (PLA), polyamide (PA), and combinations thereof.

6. A method according to claim 3, wherein the density of the fibrous board base is at least 615 $kg/m^3$.

7. A method according to claim 6 wherein the polymer is PE.

8. A method according to claim 7 wherein also an oleophobic wax is added on to the polymer.

9. A method according to claim 7 wherein oil is added on top of the polymer after moulding.

10. A method according to claim 1, wherein the board comprises a fibrous board base, wherein the density of the fibrous board base is at least 650 $kg/m^3$, and wherein the weight of the polymer coating is at least 14 $g/m^2$.

11. A method for manufacturing a product comprising a polymer coated board, wherein said product has super- or highly hydrophobic characteristics, comprising the following steps:
    a. providing a melt of polymer and a fibrous board base and coating said fibrous board base directly with said melt of polymer, wherein the product is a packaging board and the weight of the polymer coating is at least 14 $g/m^2$, wherein the density of the fibrous board base is at least 615 $kg/m^3$ and wherein the polymer is selected from the group consisting of polyethylene (PE), polypropylene (PP), ethylene vinyl alcohol (EVOH), ethylene vinyl acetate (EVA), a polyester, polyethylene terephthalate (PET), polylactic acid (PLA), polyamide (PA), and combinations thereof;
    b. passing said polymer coated board over a roll whereby said roll faces the polymer coated side and wherein also said roll provides a mould to produce said product comprising said polymer coated board with a coated side which has a pattern providing a lotus effect and wherein the roll has a mould comprising an array of squares or an array of pins; and
    c. cooling said product obtained.

12. A method according to claim 11 wherein also an oleophobic wax is added on to the polymer.

13. A method according to claim 11 wherein oil is added on top of the polymer after moulding.

14. A method according to claim 13 wherein the polymer is PE.

* * * * *